US011726915B2

(12) United States Patent
Eckert et al.

(10) Patent No.: US 11,726,915 B2
(45) Date of Patent: *Aug. 15, 2023

(54) DISTRIBUTED COHERENCE DIRECTORY SUBSYSTEM WITH EXCLUSIVE DATA REGIONS

(71) Applicant: ADVANCED MICRO DEVICES, INC., Santa Clara, CA (US)

(72) Inventors: Yasuko Eckert, Bellevue, WA (US); Maurice B. Steinman, Boxborough, MA (US); Steven Raasch, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/821,632

(22) Filed: Mar. 17, 2020

(65) Prior Publication Data

US 2020/0278930 A1 Sep. 3, 2020

Related U.S. Application Data

(63) Continuation of application No. 16/000,199, filed on Jun. 5, 2018, now Pat. No. 10,635,588.

(51) Int. Cl.
*G06F 12/0817* (2016.01)
*G06F 12/084* (2016.01)

(52) U.S. Cl.
CPC ........ *G06F 12/0824* (2013.01); *G06F 12/084* (2013.01)

(58) Field of Classification Search
CPC ............... G06F 12/0824; G06F 12/084; G06F 2212/1021
See application file for complete search history.

(56) References Cited

U.S. PATENT DOCUMENTS

| 6,374,331 | B1 * | 4/2002 | Janakiraman | ....... G06F 12/0817 711/141 |
| 2004/0088493 | A1 * | 5/2004 | Glasco | ................ G06F 12/0817 711/141 |
| 2004/0268052 | A1 * | 12/2004 | Glasco | ................ G06F 12/0817 711/141 |
| 2005/0240736 | A1 * | 10/2005 | Shaw | .................. G06F 12/0815 711/146 |
| 2007/0055826 | A1 * | 3/2007 | Morton | ............... G06F 12/0817 711/141 |

(Continued)

*Primary Examiner* — Aracelis Ruiz (57) ABSTRACT

A processing system includes a first set of one or more processing units including a first processing unit, a second set of one or more processing units including a second processing unit, and a memory having an address space shared by the first and second sets. The processing system further includes a distributed coherence directory subsystem having a first coherence directory to support a first subset of one or more address regions of the address space and a second coherence directory to support a second subset of one or more address regions of the address space. In some implementations, the first coherence directory is implemented in the system so as to have a lower access latency for the first set, whereas the second coherence directory is implemented in the system so as to have a lower access latency for the second set.

20 Claims, 6 Drawing Sheets

(56) References Cited

U.S. PATENT DOCUMENTS

2014/0181417 A1\* 6/2014 Loh ................. G06F 12/0828
  711/141
2014/0181420 A1\* 6/2014 Wicki ............... G06F 12/0831
  711/146
2018/0129606 A1\* 5/2018 Steinmacher-Burow ................
  G06F 12/0824

\* cited by examiner

DISTRIBUTED COHERENCE DIRECTORY SUBSYSTEM WITH EXCLUSIVE DATA REGIONS

CROSS-REFERENCE TO RELATED APPLICATIONS

The present application is a continuation application of U.S. patent application Ser. No. 16/000,199, now U.S. Pat. No. 10,635,588, entitled "DISTRIBUTED COHERENCE DIRECTORY SUBSYSTEM WITH EXCLUSIVE DATA REGIONS" and filed on Jun. 5, 2018, the entirety of which is incorporated by reference herein.

GOVERNMENT LICENSE RIGHTS

This invention was made with Government support under PathForward Project with Lawrence Livermore National Security (Prime Contract No. DE-AC52-07NA27344, Subcontract No. B620717) awarded by the Department of Energy (DOE). The Government has certain rights in this invention.

BACKGROUND

Processing systems that employ a shared memory often employ a coherence directory (also frequently referred to as a "probe filter") to help maintain coherency among the caches of the multiple processing units sharing the memory. Some such processing systems have a particular processing unit, or subset of processing units, that is memory bandwidth intensive, and in such instances the memory controller, and thus the coherence directory associated with the memory controller, often is located close to this high-memory-bandwidth processing unit. To illustrate, in a system implementing one or more central processing units (CPUs) on separate die along with a graphics processing unit (GPU) and shared memory integrated in the same package, the coherence directory for the system typically will be integrated near a memory controller on the GPU due to the expected bandwidth-intensive use of the shared memory by the GPU relative to the CPUs. Although this conventional approach improves the memory bandwidth of the GPU, the CPUs that access the shared memory through the memory controller on the GPU suffer relatively long coherence directory access latencies and thus risk the potential for degraded performance by the CPUs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional processing systems provide coherent shared memory via a single coherence directory that supports the entire shared address space of the memory. In such systems, a graphics processing unit (GPU) or other accelerator unit typically has the highest memory bandwidth requirements, and thus the single coherence directory often is integrated with the accelerator unit so that the accelerator unit has the lowest coherence directory access latency. However, this configuration penalizes the other processing units in the system as they experience higher coherence directory access latencies due to the relatively long signaling distances (often including multiple hops over multiple chips) to the coherence directory, and thus can exhibit degraded performance as a result.

To reduce average coherence directory access latencies throughout a processing system, the present disclosure describes example systems and techniques for employing a distributed coherence directory subsystem that supports a shared address space. In at least one embodiment, the processing system is composed of a plurality of sets of one or more processing units including a first set of one or more processing units and a second set of one or more processing units. A shared memory is integrated with, or otherwise located "close" (in the sense of access latencies) to the second set of one or more processing units and is "remote" or "farther" (again in the sense of access latencies) from the first set of one or more processing units.

In view of the disparity in access latencies, rather than using a single coherence directory, the distributed coherence directory subsystem partitions the address space of the shared memory into two (or more) coherence directories to better balance the average access latency. One coherence directory, referred to herein as the "main" coherence directory, is integrated near the shared memory and the second set of processing units, while another coherence directory, referred to herein as the "exclusive data region (EDR) coherence directory", is disposed closer to the first set of processing units. The processing system identifies those address regions expected to be accessed primarily, or "exclusively", by the one or more processing units of the first set, and configures the EDR coherence directory to support these identified address regions. The processing system also configures the main coherence directory to support some or all of the address regions of the address space that were not identified as expected to be accessed primarily or exclusively by the processing units of the first set (that is, all of the remaining address regions of the shared address space).

The processing units of the first set and the second set also are configured based on this partitioning of the address regions between the main coherence directory and the EDR coherence directory such that a coherence probe generated as a result of a last level cache (LLC) miss or other trigger event is routed by the processing unit to the selected one of these two coherence directories that has been configured to support the address region associated with the address of the coherence probe. In this manner, address regions for data accessed primarily by the processing units of the first set are more likely to be stored in the nearby EDR coherence directory and thus more rapidly accessed by the processing units in the first set than in a conventional system. Further, because the EDR coherence directory supports data regions mostly or fully exclusive to the processing units of the first set, few if any coherence probes from the processing units of the second set would be routed to the EDR coherence probe, and thus the increased access latency penalty for a processing unit accessing the EDR coherence directory compared to accessing the main coherence directory would be relatively nominal. Moreover, the decentralization or distribution of the coherence support for the shared address space over multiple dispersed coherence directories additionally benefits the average access latencies on other CPU-to-CPU probe messages, recall messages to a processing unit upon directory entry invalidations, and the like.

The distributed nature of the coherence directory subsystem can be further extended to include multiple EDR coherency directories for additional sets of one or more processing units of the system. For example, a second EDR coherence directory may support the address regions identified to be primarily or solely utilized by processing units of a third set of one or more processing units. In this manner, the latency access penalty may be further reduced through additional logical or physical partitioning of the different processing units of the system into corresponding sets and then providing set-specific partitioned coherency directories accordingly.

Figure 1:
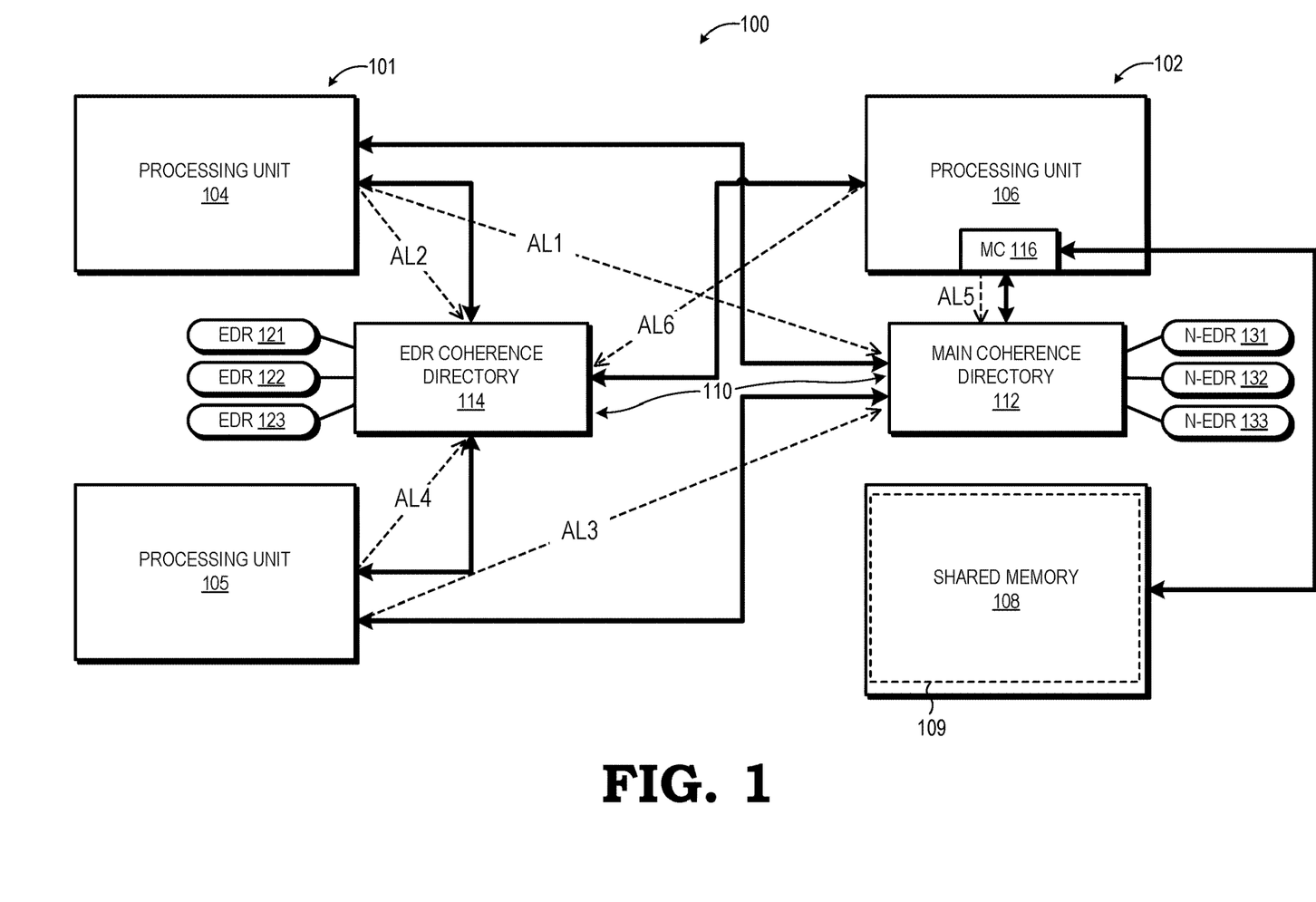
FIG. 1 is a block diagram of a processing system utilizing a distributed coherence directory subsystem for a shared memory in accordance with some embodiments.

FIG. 1 illustrates a processing system 100 employing distributed coherence directories in accordance with at least one embodiment. The processing system 100 includes two or more sets of processing units, including at least a first set 101 of one or more processing units and a second set 102 of processing units. In the depicted example, the first set 101 includes two processing units 104, 105, and the set 102 includes a single processing unit 106. The processing unit(s) of the first set 101 may be of the same type or different type as the processing unit(s) of the second set 102. In one implementation, the processing units 104, 105 are central processing units (CPUs) and the processing unit 106 is a graphics processing unit (GPU) or other accelerator unit. The processing units within a set may be of the same type or different types. The processing unit 104 could include, for example, an in-order CPU while the processing unit 105 is, for example, an out-of-order CPU. The processing units of the first set 101 and the second set 102 share an address space that maps to at least one system memory 108 (also referred to herein as "shared memory" 108). The shared address space is illustrated in FIG. 1 as a box 109 within the shared memory 108, and thus is referred to herein as shared address space 109.

To maintain cache coherence for the data accessed by the processing units 104, 105, 106 in this shared address space 109, in at least one embodiment the processing system 100 further includes a distributed coherence directory subsystem 110 that maintains a directory of cache lines currently cached by the processing units 104, 105, 106 and their corresponding coherency states, as well as filtering and directing coherence probes issued by the processing units 104, 105, 106 in accordance with a corresponding coherence protocol. However, unlike conventional directory-based cache coherence subsystems that employ a single coherence directory that covers the entire shared address space, the distributed coherence directory subsystem 110 partitions the address space 109 so as to be supported by at least two separate coherence directories, including a main coherence directory 112 and an EDR coherence directory 114, with separate address regions of the shared address space 109 distributed between the two coherence directories 112, 114, as described in greater detail herein.

In one embodiment, the main coherence directory 112 is implemented "closer" to the processing unit 106 of set 102, whereas the EDR coherence directory 114 is implemented "closer" to the processing units 104, 105, where the term "closer" in this context refers to access latency, rather than strictly physical distance. Such access latency reflects the amount of time for a coherence probe to traverse from the source component to the corresponding coherence directory, and includes signal propagation times over conductors and through transistors and other circuitry in the path between the source component and the coherence directory, and such paths may route between multiple chips and interposers. For reference herein, the access latencies between the processing unit 104 and the coherence directories 112 and 114 are identified herein as AL1 and AL2, respectively, the access latencies between the processing unit 105 and the coherence directories 112 and 114 are identified herein as AL3 and AL4, respectively, and the access latencies between the processing unit 106 and the coherence directories 112 and 114 are identified herein as AL5 and AL6, respectively. As main coherence directory 112 is "closer" to the processing unit 106 and "farther" from processing units 104, 105, and as the EDR coherence directory 114 is "closer" to the processing units 104, 105 and "farther" from the processing unit 105, the relationships of the access latencies is represented as: AL1>AL2, AL3>AL4, and AL6>AL5. Note that while in some embodiments the "main" coherence directory 112 serves as the default, or "main" coherence directory, in some implementations there may not be a "main" coherence directory, but rather only EDR coherence directories, with the address space 109 covered by sets of EDRs allocated among the multiple EDR coherence directories. In such instances, the coherence directory 112 would instead operate as an EDR coherence directory as described herein.

By partitioning the coherence directory subsystem into multiple coherence directories, it will be appreciated that each processing unit benefits from reduced access latencies when accessing the coherence directory "closer" to that processing unit, but will suffer from increased access latencies when accessing the coherence directory "farther" from that processing unit. In at least one embodiment, the distributed coherence directory subsystem 110 mitigates the increased access latency penalty of using the "farther" coherence directory by configuring the partitioning of the address regions of the shared address space 109 with the intent or goal that the majority of coherence probes issued by a given processing unit are routed to the "closer" coherence directory, thereby resulting in a lower average coherence directory access latency by a given processing unit.

To illustrate, in at least one embodiment, the processing unit 106 of set 102 is a GPU or other accelerator-type processing unit with high memory bandwidth requirements compared to the processing units 104, 105 of the set 101. To support this high bandwidth requirement, the processing system 100 is implemented so that the shared memory 108 is integrated with the processing unit 106 in the same package or otherwise located closer (with respect to signal latency) to the processing unit 106 than the processing units 104, 105, and a memory controller 116 of processing unit 106 serves to access the shared memory 108 both on behalf of the processing unit 106 as well as on behalf of the processing units 104, 105. Further in support of this high bandwidth requirement, the main coherence directory 112 is implemented with the memory controller 116 at the processing unit 106, thereby facilitating the relatively rapid access of both the main coherence directory 112 and the shared memory 108 by the processing unit 106. However, this results in increased access latencies to the main coherence directory 112 by the processing units 104, 105 of the set 101.

Accordingly, in some embodiments the EDR coherence directory 114 is utilized to support address regions expected to be accessed primarily, or "exclusively", by the processing units of the first set 101, with these address regions referred to herein as "exclusive data regions" or "EDRs", such as EDRs 121, 122, 123. In contrast, the main coherence directory 112 is utilized to support the remaining address regions, which include address regions expected to be accessed primarily by the processing unit(s) of the second set 102 and address regions expected to be accessed to some degree by both sets 101 and 102, and thus are referred to herein as "non-exclusive data regions" or "N-EDRs", such as N-EDRs 131, 132, 133. In some embodiments, the term "exclusively" in this context refers to complete exclusivity; that is, an exclusive data region is accessed solely by the processing units of the set 101. In other embodiments, the term "exclusively" in this context refers to primary usage; that is, most accesses to an exclusive data region are by the processing units of the set 101, but one or more processing units of the set 102 may also occasionally access the exclusive data region. In such embodiments, any of a variety of criteria can be used to determine whether an address region is an EDR, as described in greater detail below. By configuring the EDR coherence directory 114 to support the address regions primarily or exclusively accessed by the processing units 104, 105, whereas the main coherence directory 112 supports all other address regions of the shared address space 109, many, most, or even all of the coherence probes from the set 101 may be serviced by the EDR coherence directory 114 closer to the set 101, whereas many, most, or even all of the coherence probes from the set 102 may be serviced by the main coherence directory 112 closer to the set 102, and thus result in lower average access latencies for the processing units 104, 105 compared to a conventional implementation in which a single coherence directory would be located close to the processing unit 106, while at the same time the distributed coherence directory approach described herein incurs only a relatively slight average access latency penalty on the processing unit 106.

Figure 2:
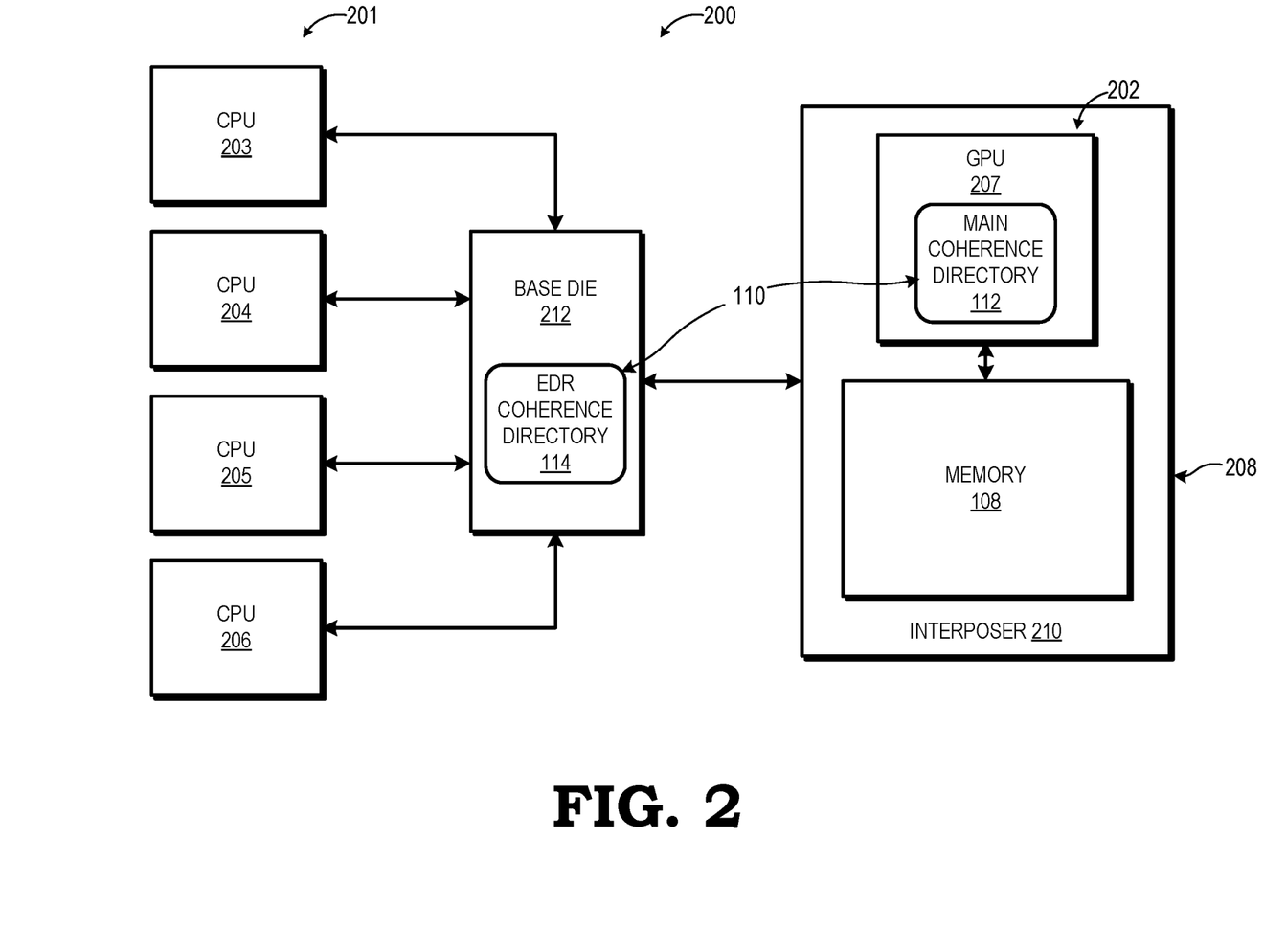
FIG. 2 is a block diagram illustrating an example multiple-die accelerated processing unit (APU) implementation of the processing system of FIG. 1 in accordance with some embodiments.

FIG. 2 illustrates benefits of this distributed coherence directory configuration in the context of an accelerated processing unit (APU)-based processing system 200 representing a specific example implementation of the processing system of FIG. 1. The processing system 200 includes two sets 201, 202 of processing units (embodiments of sets 101, 102, respectively), with set 201 including CPUs 203, 204, 205, 206 and set 201 including a GPU 207. Each of the CPUs 203-206 is implemented on a separate die. The die of the GPU 207 implements the main coherence directory 112 and is integrated with the memory 108 into an integrated circuit (IC) package 208 using an interposer 210, such that the memory 108 is external to the CPUs 203-206. The processing system 200 further includes a base die 212 that implements the EDR coherence directory 114 and serves as the interface between the CPUs 203-206 and the IC package 208.

In this configuration and with effective partitioning of the address space 109, many or all of the coherence probes from the CPUs 203-206 may be routed to the EDR coherence directory 114 on the adjacent base die 212, rather than being routed to the main coherence directory 112 implemented in the IC package 208, and thus avoid an additional die-to-interposer hop and interposer-to-die hop each direction. To illustrate by way of simple example, assume that the total access latency (round trip) for the CPUs 203-206 to access the EDR coherence directory 114 on the base die 212 is 10 microseconds (us) and 30 us to access the main coherence directory 112. In a conventional approach, a single coherence directory would be implemented in the package 208 and thus every coherence probe from the CPUs 203-206 would have an average access latency of 30 us. However, if the EDRs can be effectively identified using the distributed coherence directory scheme described herein such that, say, 80% of all coherence probes from the CPUs 203-206 are able to be routed to the EDR coherence directory 114 and 20% of all coherence probes are routed to the main coherence directory 112, then the resulting average access latency is 14 us, and thus providing a 53% reduction in average access latency over a conventional approach for the CPUs 203-206, while only slightly increasing the average access latency for the GPU 207 as coherence probes from the GPU 207 to the more remote EDR coherence directory 114 would be relatively rare assuming effective identification of those address regions used primarily or completely exclusively by the set 101.

Figure 3:
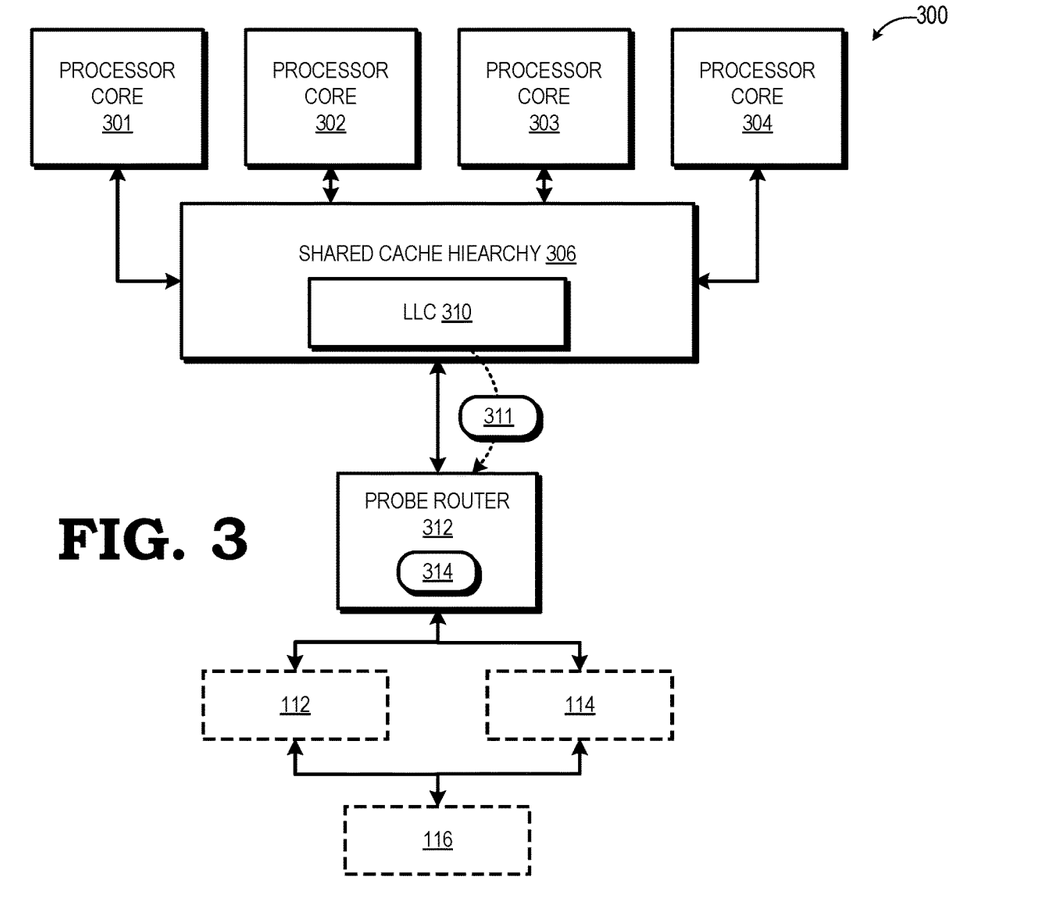
FIG. 3 is a block diagram illustrating a processing unit of the processing system of FIG. 1 implementing coherence probe routing in accordance with some embodiments of the present disclosure.

FIG. 3 illustrates an example processing unit 300 for implementation in a processing system utilizing a distributed coherence directory subsystem in accordance with at least some embodiments. The processing unit 300 represents the structure of a processing unit (e.g., any one of processing units 104, 105, 106 of FIG. 1, or CPUs 203-206 and GPU 207 of FIG. 2), and includes one or more processor cores 301, 302, 303, 304, and further may include one or more cache hierarchies (such as a cache hierarchy private to each processor core, or the illustrated shared cache hierarchy 306), the basic operations of which are well known in the art. The processing unit 300 further includes a probe filter 312 coupleable to the plurality of coherency directories of the distributed coherence directory subsystem of an implementing system, such as the main coherence directory 112 and the EDR coherence directory 114.

As the processing unit 300 shares the address space 109 with other processing units, the processing unit 300 typically participates in a coherence protocol with the other processor units so as to ensure that coherency is maintained for the cache lines of data from the shared memory 108 that are cached in the shared cache hierarchy 306. Typically, this coherence protocol specifies that whenever a coherence event is triggered, such as a cache miss at a last level cache (LLC) 310 of the cache hierarchy 306, eviction of a cache line from the cache hierarchy 306, a write request issued by a processor core, or other cache line coherence state upgrade, downgrade, or invalidation, the cache hierarchy 306 generates a coherence probe for further processing by a coherence directory. In a conventional system, there is only a single coherence directory and thus only one possible destination for any coherence probe generated by the cache hierarchy. However, in the distributed coherence directory scheme described herein, the shared address space is partitioned among multiple coherence directories, and thus in at least one embodiment the processing unit 300 implements the probe router 312 to direct coherence probes (e.g., coherence probe 311) from the processing unit 300 to the appropriate target coherence directory based on probe routing configuration information 314 implemented in the probe router 312. In some embodiments, the probe router 312 is implemented as hardcoded logic and other circuitry on the die implementing the processing unit 300. In other embodiments, the probe router 312 is implemented using programmable logic of the die or implemented as software or firmware executed by one or more of the processor cores 301-304. In still other embodiments, the probe router 312 is implemented as a combination of one or more of hardcoded logic, programmable logic, software, or firmware.

The probe routing configuration information 314 includes one or a combination of data, one or more data structures, or programmable logic that is used by the probe router 312 to select one of the coherence directories 112, 114 as the target coherence directory for a given coherence probe, and thus the probe routing configuration information 314 is based on the partitioning of the address space 109 between these two coherence directories. As explained above, in some embodiments the EDR coherence directory 114 is configured to support processing of coherence probes for addresses associated with exclusive data regions, and thus the probe routing configuration information 314 is configured to route all coherence probes with addresses falling within the identified exclusive data regions to the EDR coherence directory 114 and route all other coherence probes to the main coherence directory 112 by default. As such, the probe routing configuration information 314 may be configured in any of a variety of formats that facilitate this routing. For example, in one embodiment the probe routing configuration information 314 takes the form of a bitmask function configured based on the address ranges of the identified exclusive data regions so that the other logic of the probe router 312 applies the bitmask function to the address of a coherence probe and compares the result to a set of one or more masked address ranges to determine whether the address falls within one of the identified exclusive data regions and then routes the coherence probe accordingly. In another embodiment, the probe routing configuration information 314 takes the form of a look up table (LUT) having table entries, each of which can be populated with information identifying the address range of a corresponding exclusive data region, and thus LUT access logic of the probe router 312 can identify the target coherence directory of a generated coherence probe by performing a look up into the LUT using the address of coherence probe and identifying whether the address of the coherence probe falls into one of the EDR address ranges represented therein. The configuration of the probe router 312 and the routing of coherence probes is described in greater detail below with reference to FIGS. 5-7.

Figure 4:
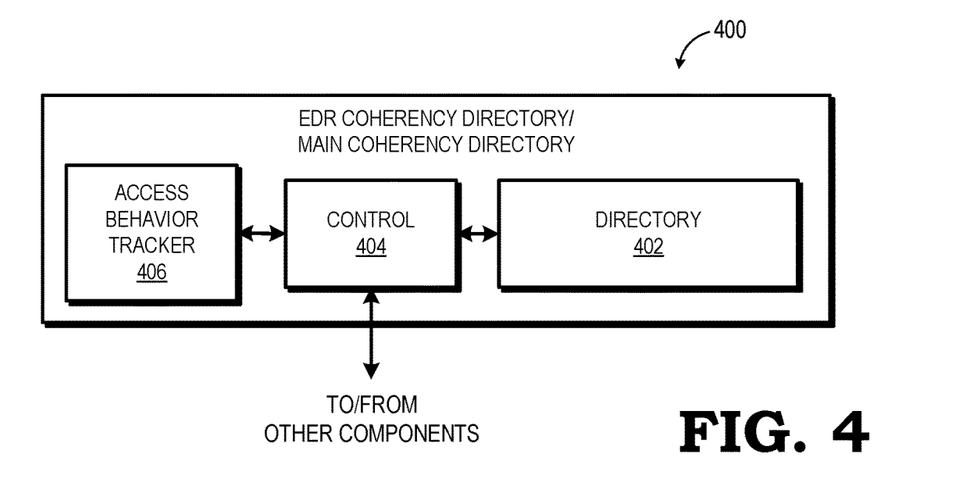
FIG. 4 is a block diagram illustrating a coherence directory of the distributed coherence directory subsystem of the processing system of FIG. 1 in accordance with some embodiments of the present disclosure.

FIG. 4 illustrates an example distributed coherence directory 400 for use in a distributed coherence directory subsystem of a processing system in accordance with at least some embodiments. The distributed coherence directory 400 thus represents the general structure implemented by either of the main coherence directory 112 or the EDR coherence directory 114. In one embodiment, the distributed coherence directory 400 includes a directory structure 402 and corresponding control logic 404. The directory structure includes a table, array, or other data structure having a plurality of entries, each entry configured to store coherence state information and associated information for a corresponding cache line according to a corresponding cache coherence protocol as is well known in the art. The control logic 404 is coupled to the directory structure 402 and includes an interface to receive and transmit coherence probes and other signaling from other components in the processing system implementing the distributed coherence directory subsystem. The control logic 404 processes incoming coherence probes to update the information stored in the directory structure 402, as well as to issue coherence probes responsive to information stored in the directory structure 402, using any of a variety of techniques well known in the art.

As is described in greater detail below, in some embodiments the identification of EDRs within the shared address space 109 and resulting partitioning of the address space between the two or more coherence directories (e.g., coherence directories 112, 114) is based on one or both of an analysis of the expected memory access behavior of one or more of the sets of processing units or a monitoring of the actual memory access behavior of the one or more sets during operation. In implementations wherein monitoring of actual memory access behavior is utilized, either or both of the main coherence directory 112 or the EDR coherence directory 114 further can include an access behavior tracker structure 406 to facilitate tracking or monitoring of the actual memory access behavior through, for example, recording information regarding which address regions have been accessed by the first set 101, which address regions have been accessed by the second set 102, and the like. The access behavior tracker structure 406 may be implemented as, for example, a relatively small static random access memory (SRAM), a register file, and the like. The operation of the access behavior tracker structure 406 is described in greater detail below with reference to FIG. 6.

Figure 5:
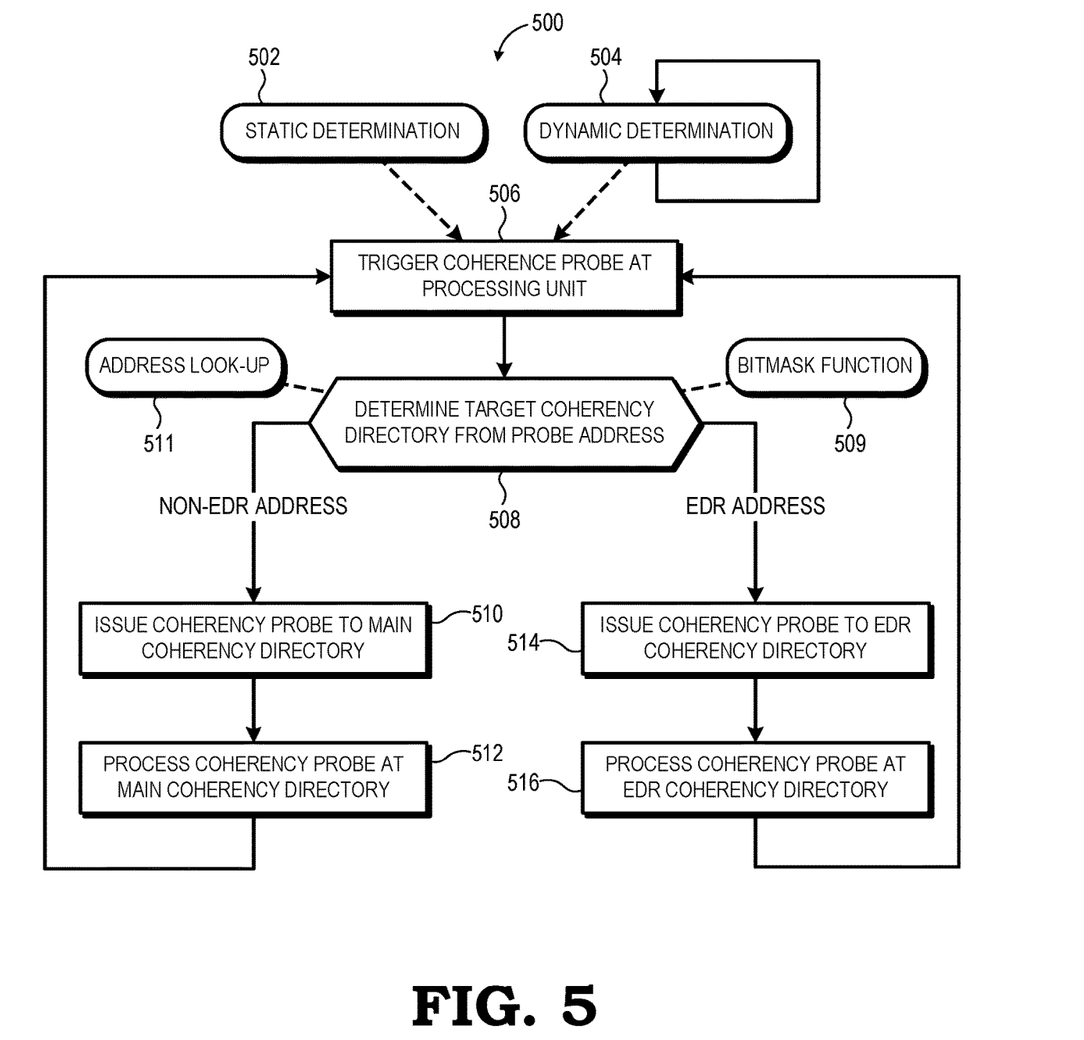
FIG. 5 is a flow diagram illustrating a method for coherence probe filtering using a distributed coherence directory subsystem in accordance with some embodiments of the present disclosure.

FIG. 5 illustrates a method 500 of operation of a processing system implementing a distributed coherence directory subsystem in accordance with some embodiments. For ease of reference, the method 500 is described in the example context of the processing system 100 of FIGS. 1-4, which includes two coherency directories. However, this method may be extended to systems using distributed coherence directory subsystems with more than two coherency directories using the guidelines provided herein.

The method 500 initiates with at least an initial configuration of the partitioning of the address space 109 among the two coherence directories 112, 114. The processing system 100 may employ either a static mode (represented by block 502) of partitioning the address space wherein the partitioning is fixed up front based on pre-execution analysis of the expected memory access behavior of the set 101 of processing units, or a dynamic mode of partitioning (represented by block 504) whereby the partitioning is modified throughout operation based on concurrent monitoring of actual memory access behavior of the set 101. The static mode of partitioning is described in greater detail below with reference to FIG. 6, and the dynamic mode of partitioning is described in greater detail below with reference to FIG. 7.

As described below, whether fixedly configured in the static mode or changeably configured in the dynamic mode, the partitioning of the shared address space 109 includes configuration of the probe routers 312 of each processing unit in the processing system 100 via configuration of the corresponding probe routing configuration information 314 to reflect the current partitioning. With this set, when a coherence probe is triggered at one of the processing units of the processing system 100 at block 506, the address of the coherence probe is supplied to the probe router 312 of the processing unit. At block 508, the probe router 312 selects one of the main coherence directory 112 or the EDR coherence directory 114 (or another EDR coherence directory in the event that there are multiple EDR coherency directories) as the target coherence directory for the coherence probe using the address of the coherence probe and the probe routing configuration information 314. The probe router 312 can make this determination by, for example, applying a bitmask function (block 509) to the address and comparing the result to a predefined set of masked addresses representing the identified EDRs, or by performing a lookup (block 511) into a lookup table (LUT) with entries representing the address ranges of the identified EDRs.

In the event that the address of the coherence probe does not fall into one of the address ranges of the identified EDRs, in some embodiments the probe router 312 identifies the main coherence directory 112 as the target of the coherence probe. In other embodiments with multiple EDR coherency directories or in embodiments with only EDR coherency directories (that is, without a main coherence directory), the target coherence directory instead may be another EDR coherence directory rather than the main coherence directory. In response, at block 510 the probe router 312 issues the coherence probe for receipt by the main coherence directory 112, and at block 512 the main coherence directory 112 processes the coherence probe in the typical manner according to the particular coherence protocol implemented by the processing system 100. Conversely, in the event that the address of the coherence probe falls into the address range of one of the identified EDRs, the probe router 312 identifies the EDR coherence directory 114 as the target of the coherence probe. In response, at block 514 the probe router 312 issues the coherence probe for receipt by the EDR coherence directory 114, and at block 516 the EDR coherence directory 114 processes the coherence probe in accordance with the coherence protocol implemented by the processing system 100. Method 500 then returns to block 506 for another iteration responsive to the next coherence probe issued by a processing unit of the system 100 in accordance with the current partitioning of the address space at time of generation of the coherence probe.

Figure 6:
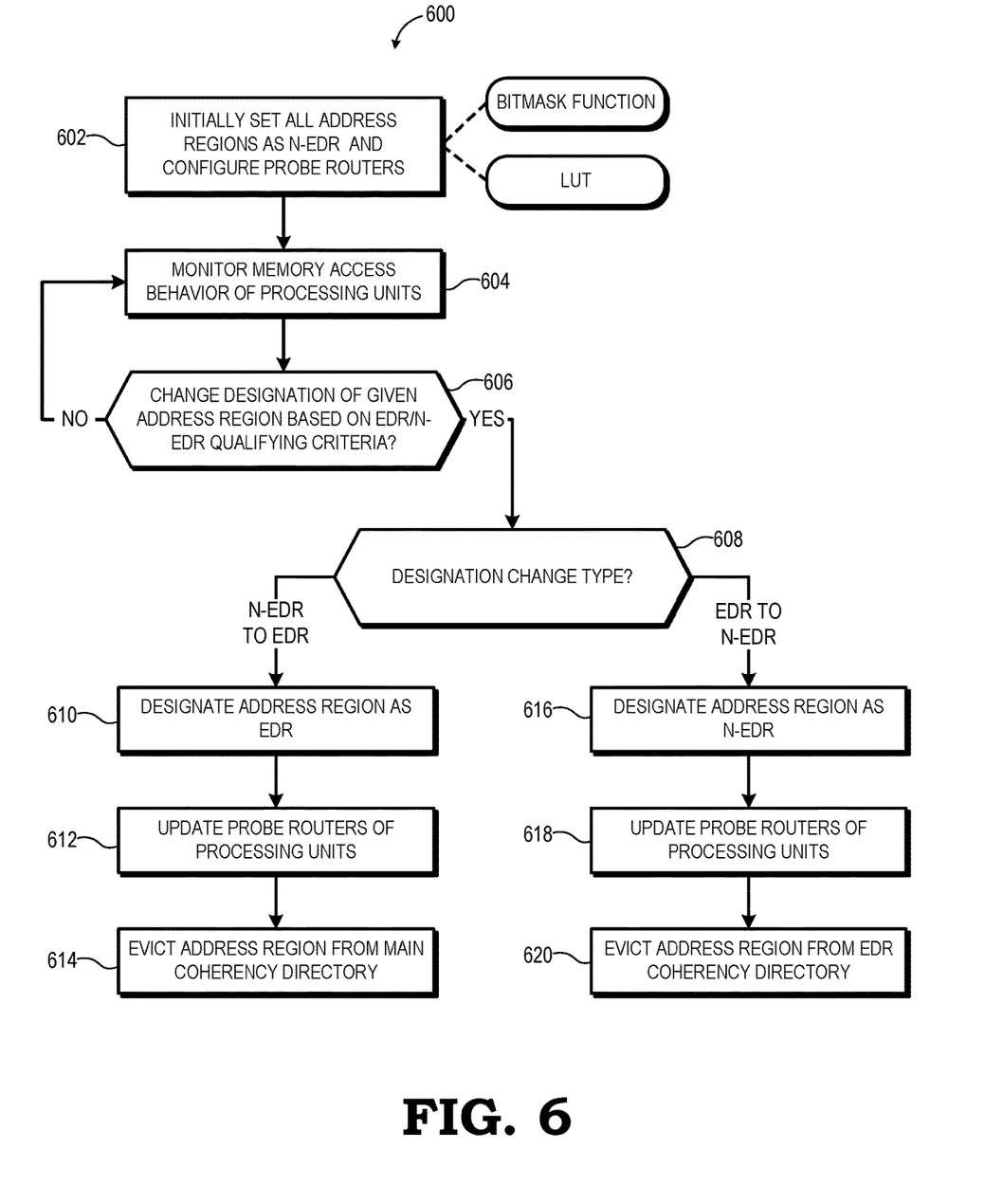
FIG. 6 is a flow diagram illustrating a method for statically configuring distributed coherence directory subsystem with exclusive data regions and non-exclusive data regions in accordance with some embodiments of the present disclosure.

FIG. 6 illustrates a method 600 for dynamic identification and configuration of a partitioning of the address space of a shared memory space for a distributed coherence directory subsystem in accordance with at least some embodiments. The method 600 is described in the example context of the processing system of FIGS. 1-4, and represents one implementation of the dynamic mode of block 504 of FIG. 5. In this dynamic mode, the partitioning of the address space 109 into EDRs supported by the EDR coherence directory 114 and N-EDRs supported by the main coherence directory 112 is based on dynamic monitoring of the actual memory access behavior of the sets 101 and 102 of processing units. As explained above, the main coherence directory 112, in one embodiment, implements the access behavior tracker structure 406 to facilitate this monitoring. Accordingly, to allow the main coherence directory 112 to monitor the initial actual memory access behavior, at block 602 the initial partitioning of the address space 109 is set so that all address regions of the address space 109 are initially designated as N-EDRs (i.e., the main coherence directory 112 services all coherence probes from the sets 101 and 102), and the bitmask function or LUT used by the probe router 312 of each processing unit is configured according to this default all N-EDR setting. The address regions then may be re-designated as EDRs, and EDRs re-designated back to N-EDRs, based on the monitoring of memory access behavior by both sets 101 and 102.

At block 604, execution of workloads at the sets 101 and 102 proceed, and the main coherence directory 112 monitors the memory access behavior of the sets 101 and 102 by identifying the address regions referenced by the coherence probes generated during execution of these workloads and tracking the accesses to these identified address regions in the access behavior tracker structure 406. To illustrate, in one embodiment when a coherence probe for an address region not yet tracked is received by the main coherence directory 112, the control logic 404 allocates an entry in the access behavior tracker structure 406, and thereafter tracks any subsequent accesses to this address regions using the entry, including whether the source of the access was from the set 101 or the set 102.

Periodically or in response to a specified trigger, at block 606 the main coherence directory 112 analyzes the tracked address regions to determine whether the designation of any tracked address region should be changed from N-EDR to EDR, or from EDR to N-EDR based on one or more qualifying criteria. Such qualifying criteria may include an absolute criterion, such as changing an address region from N-EDR to EDR in response to a threshold number of at least X memory accesses to the address region by the set 101 and a threshold number of less than N memory accesses to the address region by the set 102 or in response to a threshold number of at least Y memory accesses to the address region by the set 101 and a threshold number of less than M memory accesses to the address region by the set 102 in the last Z clock cycles, or changing the address region from EDR to N-EDR in response to a threshold number of at least K memory accesses to the address region by the set 102. The qualifying criteria additionally or alternatively may include a relative, or comparative, criterion, such as changing the designation of an address region from N-EDR to EDR responsive to the ratio of memory accesses by the set 101 to the address region to memory accesses by the set 102 to the address region exceeding a threshold of X:1. In the event that EDRs are used to represent completely exclusive data regions, then the change in designation of an address region from EDR back to N-EDR could occur in response to the first access to that address region by the set 102. The process of blocks 604, 606, and 608 is similarly performed by the EDR coherence directory 114 to monitor the memory access behavior of the set 102 to identify EDRs that should be re-designated as N-EDRs due to utilization by the processing unit(s) of the set 102 in excess of a threshold or similar criterion.

The change in EDR/N-EDR designation for a tracked address region triggers the coherence directories 112, 114 to determine the designation change type (block 608) and proceed with reconfiguration of the partitioning of the address space 109. In the event that the tracked address region is changing from N-EDR to EDR, at block 610 the address region is marked as such that EDR coherence directory 114 assumes responsibility for supporting coherence probes to the tracked address region. As part of this partition reconfiguration, at block 612 the main coherence directory 112 (or alternatively the EDR coherence directory 114) reconfigures the probe routers 312 of the processing units of sets 101 and 102 to reflect the re-designation of the address region as an EDR. In one embodiment, this reconfiguration includes modifying the bitmask function used by the probe router 312 and the corresponding set of masked addresses representing the address ranges of the EDRs. In other embodiments, this reconfiguration includes adding an entry to the LUT employed by the probe router 312 to represent the address region as an EDR. Further, to enable the EDR coherence directory 114 to support the coherence probes issued for the newly-designated EDR, at block 614 the main coherence directory 112 evicts the one or more entries associated with the address region from its directory structure and transmits the one or more evicted entries to the EDR coherence directory 114 for storage at the directory structure of the EDR coherence directory 114.

Returning to block 608, in the event that the tracked address region is changing from EDR to N-EDR, at block 616 the address region is marked as such that the main coherence directory 112 assumes responsibility for supporting coherence probes to the tracked address region from the EDR coherence directory 114. As part of this partition reconfiguration, at block 618 the main coherence directory 112 (or alternatively the EDR coherence directory 114) reconfigures the probe routers 312 of the processing units of sets 101 and 102 to reflect the re-designation of the address region as an N-EDR via, for example, reconfiguration of the bitmask function and corresponding set of masked addresses or through removal of the corresponding entry from the LUT. Further, to enable the main coherence directory 112 to support the coherence probes issued for the newly-designated N-EDR, at block 620 the EDR coherence directory 114 evicts the one or more entries associated with the address region from its directory structure and transmits the one or more evicted entries to the main coherence directory 112 for storage at the directory structure of the EDR coherence directory 114.

Figure 7:
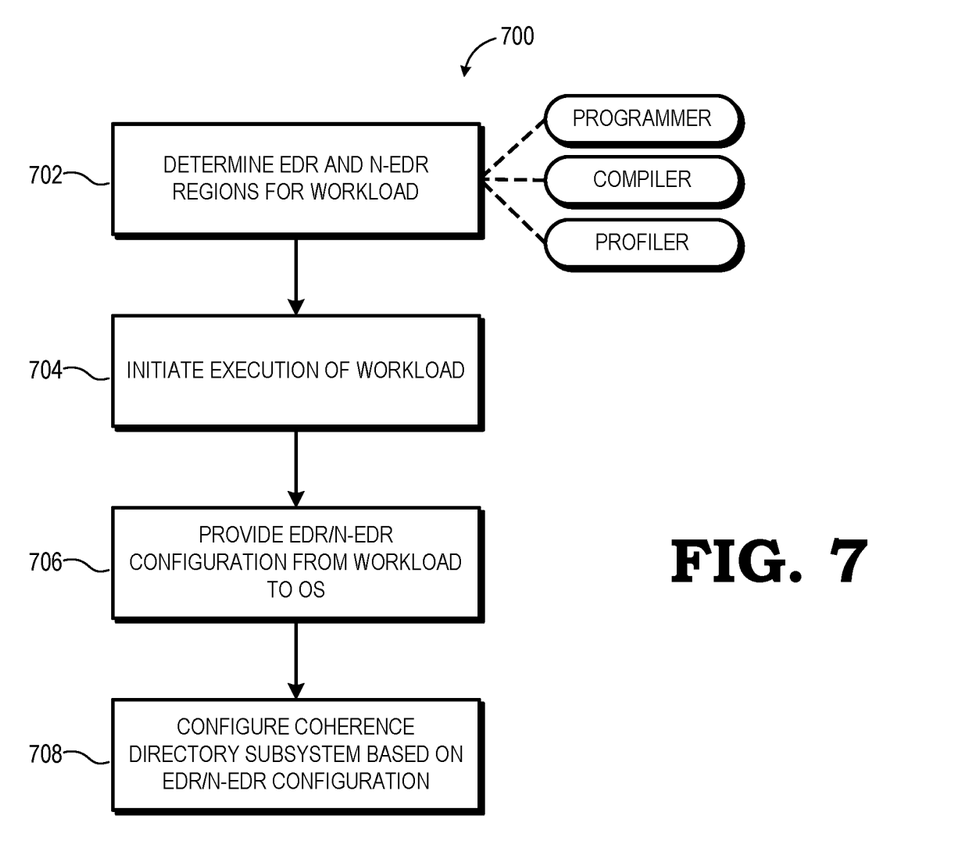
FIG. 7 is a flow diagram illustrating a method for dynamically configuring distributed coherence directory subsystem with exclusive data regions and non-exclusive data regions in accordance with some embodiments of the present disclosure.

FIG. 7 illustrates a method 700 for static identification and configuration of a partitioning of the address space of a shared memory space for a distributed coherence directory subsystem in accordance with at least some embodiments. The method 700 is described in the example context of the processing system of FIGS. 1-4, and represents one implementation of the dynamic mode of block 502 of FIG. 5. In the static mode, the partitioning of the address space 109 into EDRs supported by the EDR coherence directory 114 and N-EDRs supported by the main coherence directory 112 is based on pre-execution analysis at block 702 of the expected memory access behavior of the one or more programs, threads, or other processes that constitute a workload to be executed by the set 101. This pre-execution analysis can include, for example, analysis by an offline profiler or compiler, or may include a programmer or developer analyzing the code of the workload and identifying by hand the address regions to be primarily or completely exclusively accessed by the workload. The information identifying the address regions to be designated as EDRs is then embedded in, or otherwise associated with, the code or data representing the workload.

At some subsequent point, at least an initial portion of the data/code representing the workload is retrieved from memory and at block 704 execution of the workload is initiated at the set 101 of processing units using this initial portion of data/code. As part of this initial execution, at block 706 the information regarding the address regions to be designated as EDRs is provided from the workload to an operating system (OS), a hypervisor, an API, or other function, and at block 708 the OS configures the distributed coherence directory subsystem 110 according to this information. In one embodiment, the OS or other executable function at the set 101 determines the bitmap function configuration or LUT table configuration that supports the specified EDR/N-EDR partition and then signals all of the processing units in the sets 101 and 102 to configure their probe routers 312 using the determined configuration. In another embodiment, the OS or other executable function provides data representative of the EDR/N-EDR partition to the main coherence directory 112, which then determines the appropriate bitmask function configuration or LUT configuration for the probe router 312 of the processing units of the sets 101 and 102.

In some embodiments, certain aspects of the techniques described above may be implemented by one or more processors of a processing system executing software or firmware. The software or firmware includes one or more sets of executable instructions stored or otherwise tangibly embodied on a non-transitory computer readable storage medium. The software or firmware can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a first die coupleable to a plurality of processing units separate from the first die, the first die implementing a first coherence directory configured to support a first subset of one or more address regions of an address space for the plurality of processing units via a memory controller configured to control access to the first subset of one or more address regions, wherein the memory controller is integrated on an integrated circuit (IC) package separate from the first die.

2. The system of claim 1, wherein:
the first die is coupleable to a set of one or more second die;
the first die is coupleable to the IC package;
each second die implements a processing unit of a first type; and
the IC package comprises a processing unit of a second type.

3. The system of claim 2, wherein:
the processing unit of the first type is a central processing unit (CPU); and
the processing unit of the second type is a graphics processing unit (GPU).

4. The system of claim 2, wherein:
access latencies between the first die and the set of one or more second die are less than an access latency between the first die and the IC package.

5. The system of claim 4, wherein the one or more address regions of the first set are exclusive to processing units of the set of one or more second die.

6. The system of claim 2, further comprising:
the set of one or more second die; and
the IC package.

7. The system of claim 6, wherein the IC package further comprises:
a memory having the address space.

8. The system of claim 7, wherein the IC package further comprises:
a second coherence directory configured to support a second subset of one or more address regions of the address space.

9. The system of claim 1, wherein the first die is configured to:
receive and process coherence probes from a processing unit of a subset of the plurality of processing units, wherein the first subset of one or more address regions are exclusive to the subset of the plurality of processing units.

10. A method for coherency probe routing in a system comprising a distributed coherence directory subsystem having at least a first coherence directory at a first die and a second coherence directory at a second die separate from the first die, the method comprising:
determining a partitioning of an address space between at least the first coherence directory of the first die and the second coherence directory of the second die for a workload to be executed; and
configuring probe routers of a plurality of processing units to route coherence probes to the first coherence directory or the second coherence directory based on the partitioning.

11. The method of claim 10, wherein configuring one or more probe routers comprises configuring a bitmask function of a probe router based on the partitioning, wherein the probe router uses the bitmask function to route a coherence probe based on an address associated with the coherence probe.

12. The method of claim 10, wherein configuring one or more probe routers comprises configuring a lookup table (LUT) of a probe router based on the partitioning, wherein the probe router uses the LUT to route a coherence probe based on an address associated with the coherence probe.

13. The method of claim 10, wherein:
the plurality of processing units includes:
a first subset of one or more processing units having lower access latencies for the first die than the second die; and
a second subset of one or more processing units having lower access latencies for the second die than the first die; and
determining the partitioning of the address space comprises:
assigning a first set of one or more address regions associated with addresses utilized for a first portion of the workload to be performed by the first subset of one or more processing units to the first coherence directory; and
assigning a second set of one or more address regions associated with addresses utilized for a second portion of the workload to be performed by the second subset of one or more processing units to the second coherence directory.

14. The method of claim 13, wherein:
the first subset of one or more processing units is composed of one or more central processing units (CPUs); and
the second subset of one or more processing units is composed of one or more graphics processing units (GPUs).

15. The method of claim 14, wherein:
each of the one or more CPUs is implemented on a separate die connected to the first die; and
each of the one or more GPUs is implemented at an integrated circuit (IC) package having the second die.

16. A processing system comprising:
a set of one or more first die, each first die implementing a processing unit of a first type;
a second die connected to the set of one or more first die and implementing a first coherency directory of a distributed coherency directory subsystem; and
an integrated circuit (IC) package comprising a processing unit of a second type, a second coherency directory of the distributed coherency directory subsystem, a memory, and a memory controller configured to control access to the memory for the processing units of the first type and the processing units of the second type;
wherein the first coherency directory is configured to support a first set of one or more address regions of an address space of the memory that are exclusive to the processing unit of the first type; and
wherein the second coherency directory is configured to support a second set of one or more address regions of the address space.

17. The processing system of claim 16, wherein the second set of one or more address regions includes one or more address regions accessed by both the processing unit of the first type and the processing unit of the second type.

18. The processing system of claim 17, wherein the second set of one or more address regions further includes one or more address regions exclusive to the processing unit of the second type.

19. The processing system of claim 18, wherein access latencies between the set of one or more first dies and the second die are less than an access latency between the second die and the IC package.

20. The processing system of claim 16, wherein the processing unit of the first type is a central processing unit (CPU) and the processing unit of the second type is a graphics processing unit (GPU).

* * * * *